(12) United States Patent
Karl et al.

(10) Patent No.: US 8,935,936 B2
(45) Date of Patent: Jan. 20, 2015

(54) HEAT EXCHANGE DEVICE CONTAINING HEAT STORAGE MATERIAL

(75) Inventors: Stefan Karl, Fourqueux (FR); Abdelmajid Taklanti, Gif sur Yvette (FR); Laurent Labaste Mauhe, Paris (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 533 days.

(21) Appl. No.: 13/379,755

(22) PCT Filed: May 18, 2010

(86) PCT No.: PCT/EP2010/056777
§ 371 (c)(1),
(2), (4) Date: May 3, 2012

(87) PCT Pub. No.: WO2010/133571
PCT Pub. Date: Nov. 25, 2010

(65) Prior Publication Data
US 2012/0204597 A1    Aug. 16, 2012

(30) Foreign Application Priority Data

May 19, 2009  (FR) .................................... 09/02437

(51) Int. Cl.
*B60H 1/32*       (2006.01)
*F28D 20/02*      (2006.01)
(Continued)

(52) U.S. Cl.
CPC .............. *F28D 20/02* (2013.01); *F25B 39/022* (2013.01); *F28D 1/05366* (2013.01);
(Continued)

(58) Field of Classification Search
CPC .... F25B 39/022; F25B 2400/24; F28F 1/126; F28F 3/025; Y02E 60/145; Y02E 60/142
USPC ............................... 62/243, 529; 165/104.19
See application file for complete search history.

(56) References Cited

U.S. PATENT DOCUMENTS 3,548,923 A * 12/1970 Kunihiko et al. ............. 165/236
3,916,872 A * 11/1975 Kreis et al. ................... 126/375.1
(Continued)

FOREIGN PATENT DOCUMENTS

DE    102004035818 A1    3/2006
DE    102004055340 A1    5/2006
(Continued)

OTHER PUBLICATIONS

Translation of FR 2698784 to Daniel et al.*
(Continued)

*Primary Examiner* — Mohammad M Ali
(74) *Attorney, Agent, or Firm* — Howard & Howard Attorneys PLLC

(57) ABSTRACT

The invention relates to a heat exchange device including at least two tubes (12) for circulating a heat transfer fluid arranged in at least two rows ($R_1$, $R_2$) offset two-by-two from one row to the other. A heat exchange fin (20) and a heat storage tank (22) made from a heat storage material extend transversely to the rows of the tubes ($R_1$, $R_2$) forming a group of tanks and tubes (24) in each instance, wherein a single heat storage tank (22) is in contact with one tube (12) of each row of tubes ($R_1$, $R_2$). The contact with the tubes (12) takes place alternately on two opposing walls (26, 28) of the heat storage tank (22), and the walls (26, 28) are also in contact with fins (20). The invention can be used for the air-conditioning evaporators of automobiles.

19 Claims, 7 Drawing Sheets

(51) Int. Cl.
*F25B 39/02* (2006.01)
*F28D 1/053* (2006.01)
*F28D 20/00* (2006.01)
*F28F 1/12* (2006.01)
*F28F 3/02* (2006.01)
*F28D 21/00* (2006.01)

(52) U.S. Cl.
CPC .............. *F28D 20/00* (2013.01); *F28F 1/126* (2013.01); *F28F 3/025* (2013.01); *F25B 2400/24* (2013.01); *F28D 2020/0013* (2013.01); *F28D 2021/0085* (2013.01); *Y02E 60/142* (2013.01); *Y02E 60/145* (2013.01)
USPC .............................................. 62/243; 62/529

(56) References Cited

U.S. PATENT DOCUMENTS

| | | | | |
|---|---|---|---|---|
| 4,007,776 | A * | 2/1977 | Alkasab | 165/236 |
| 4,280,483 | A * | 7/1981 | Schaffer | 126/618 |
| 4,448,347 | A * | 5/1984 | Dunstan | 237/2 B |
| 5,092,196 | A * | 3/1992 | Kameda et al. | 74/606 R |
| 5,535,817 | A * | 7/1996 | Dunne | 165/104.12 |
| 6,102,103 | A * | 8/2000 | Zobel et al. | 165/10 |
| 6,378,605 | B1 * | 4/2002 | Kutscher et al. | 165/181 |
| 6,474,089 | B1 * | 11/2002 | Chen | 62/235.1 |
| 6,691,527 | B2 * | 2/2004 | Bureau et al. | 62/244 |
| 6,964,178 | B2 * | 11/2005 | Aikawa et al. | 62/434 |
| 7,143,604 | B2 | 12/2006 | Bureau et al. | |
| 7,891,412 | B2 | 2/2011 | Loup et al. | |
| 8,122,943 | B2 | 2/2012 | Haller et al. | |
| 8,711,563 | B2 * | 4/2014 | Campbell et al. | 361/696 |
| 2003/0116560 | A1 * | 6/2003 | Wyatt | 219/621 |
| 2007/0084709 | A1 * | 4/2007 | Koyano et al. | 200/341 |
| 2008/0041087 | A1 * | 2/2008 | Muller | 62/305 |
| 2008/0245083 | A1 * | 10/2008 | Tutunoglu et al. | 62/115 |
| 2009/0097205 | A1 * | 4/2009 | Matsushima et al. | 361/700 |
| 2009/0133866 | A1 * | 5/2009 | Campbell et al. | 165/288 |

FOREIGN PATENT DOCUMENTS

| | | |
|---|---|---|
| FR | 2698784 * | 6/1994 |
| FR | 2861166 A1 | 4/2005 |
| FR | 2878613 A1 | 6/2006 |
| FR | 2878614 A1 | 6/2006 |
| WO | WO 2006/059005 A1 | 6/2006 |

OTHER PUBLICATIONS

Translation of DE 102004035818 to Roland et al.*
English language abstract for DE 102004035818 extracted from the espacenet.com database on May 15, 2012, 18 pages.
English language abstract for DE 102004055340 extracted from the espacenet.com database on May 15, 2012, 13 pages.
English language abstract for FR 2861166 extracted from the espacenet.com database on May 15, 2012, 36 pages.
English language abstract for FR 2878613 extracted from the espacenet.com database on May 15, 2012, 28 pages.
English language abstract for FR 2878614 extracted from the espacenet.com database on May 15, 2012, 43 pages.
English language abstract for WO 2006/059005 extracted from the espacenet.com database on May 15, 2012, 63 pages.
Traite De Cooperation en Matiere De Brevets—Rapport De Recherche Internationale (International Search Report) for Application No. PCT/EP2010/056777 dated Aug. 10, 2010, 5 pages.

* cited by examiner

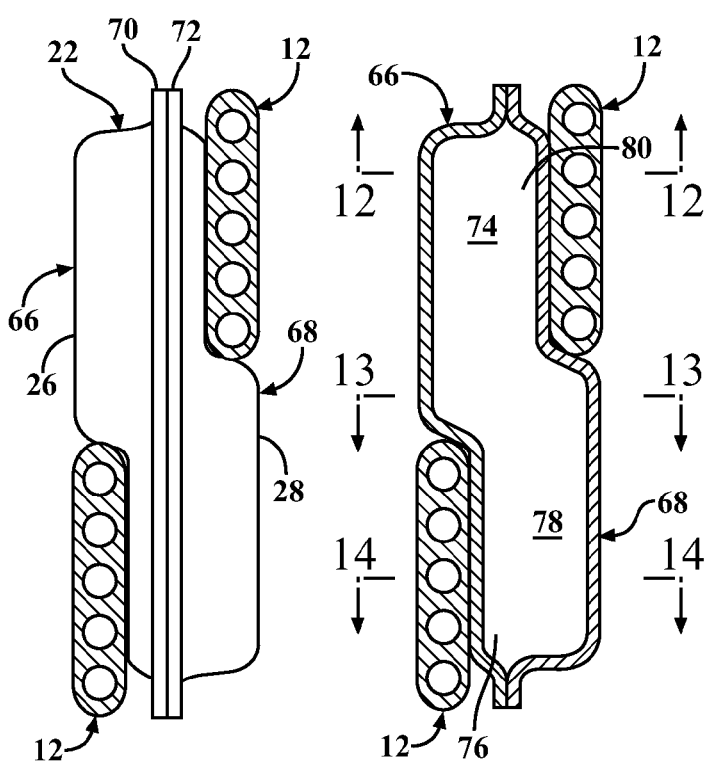
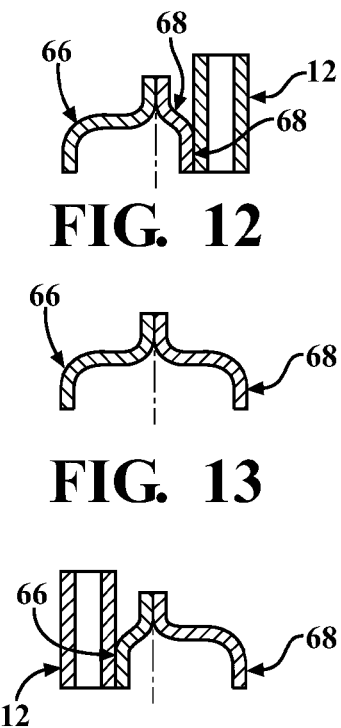
FIG. 12
FIG. 13
FIG. 14
FIG. 10
FIG. 11
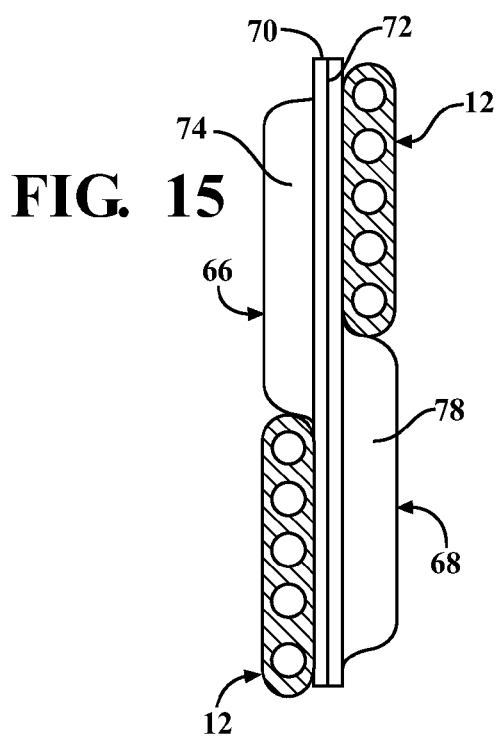
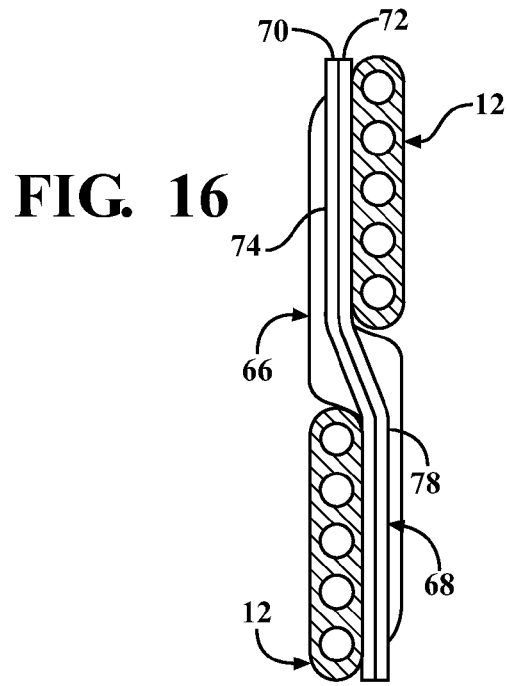
FIG. 15
FIG. 16

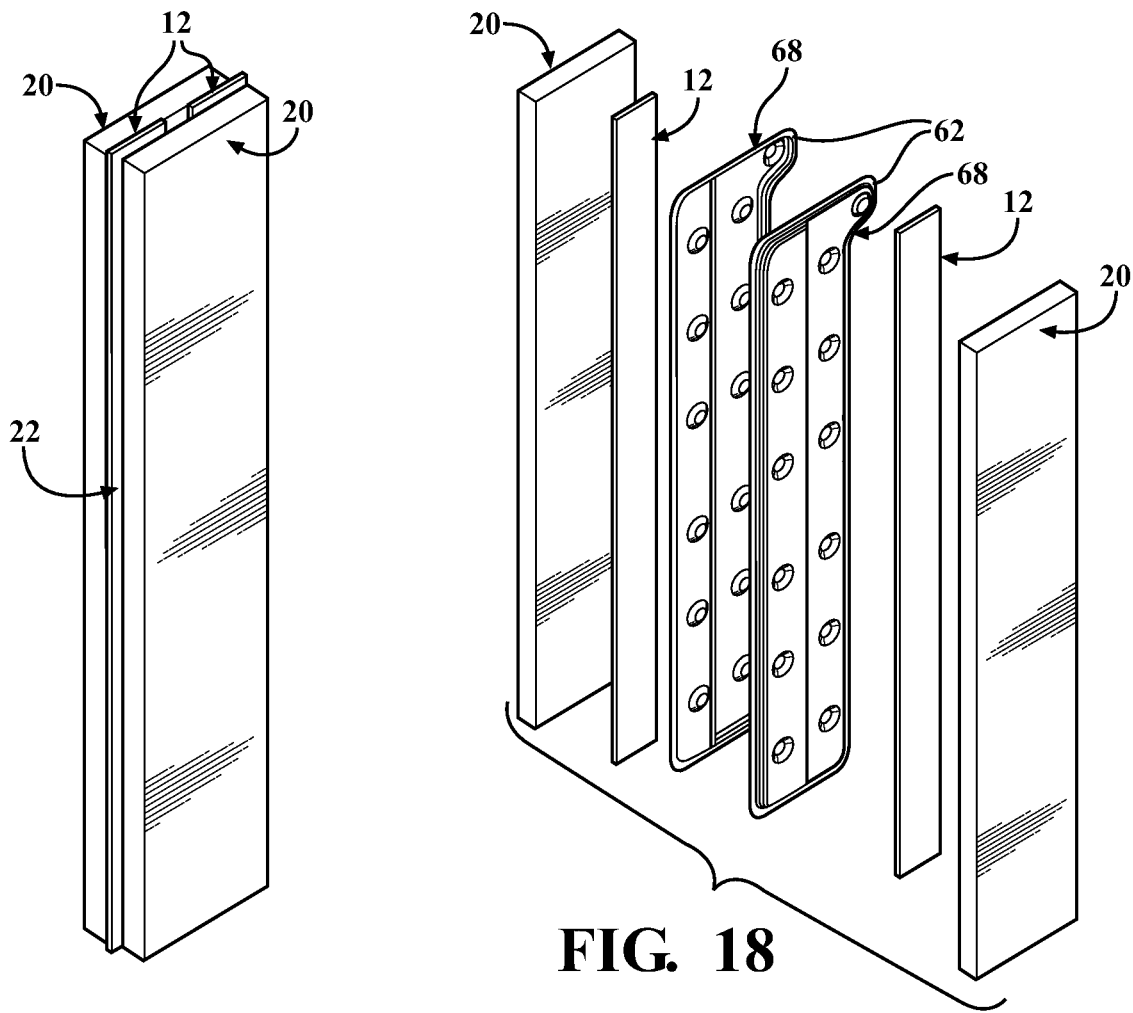
FIG. 18
FIG. 17
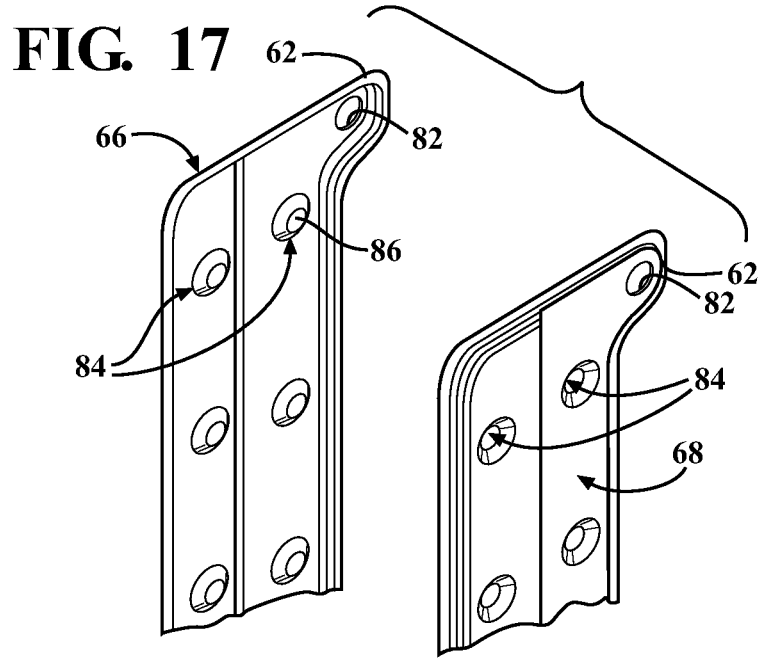
FIG. 19

HEAT EXCHANGE DEVICE CONTAINING HEAT STORAGE MATERIAL

RELATED APPLICATIONS

This application claims priority to and all the advantages of International Patent Application No. PCT/EP2010/056777, filed on May 18, 2010, which claims priority to French Patent Application No. FR 09/02437, filed on May 19, 2009.

The invention relates to the field of heat exchange devices, particularly to heat exchangers, particularly for installations in motor vehicles.

It more particularly relates to a heat exchange device comprising a stack constituted of at least two circulation tubes of a heat transfer fluid, a heat exchange fin, and a heat storage reservoir of a heat storage material.

In such a device, the tube stack serves to enable a heat exchange between the heat transfer fluid which circulates in the tubes and an external fluid flowing through the fin, for example an air flow.

The fins, particularly made in an corrugated shape, serve as heat exchange wings. These fins are adapted to increase the heat exchange surface and to disrupt the external fluid flowing through the tubes stack to increase the heat exchange performance.

Such heat exchange device can, for example, be part of the air-conditioning system of a motor vehicle. In this case, the external fluid is generally an air flow intended to be blown into the passenger compartment of the vehicle, and the heat transfer fluid is preferably a refrigerant fluid. According to this arrangement, the object of the heat exchange is to cool the flow of blown air.

The circulation of the heat transfer fluid inside the air-conditioning circuit is carried out by a compressor, generally driven directly by the engine of the motor vehicle.

Consequently, when the engine of the motor vehicle is at a standstill, the heat transfer fluid stops circulating and the heat exchange between the air flow and the heat transfer fluid can no longer function. The air flow blown into the passenger compartment is thus no longer cooled down.

This situation is all the more a problem as there are now systems which provide for the engine to stop automatically when the vehicle stops moving in order to decrease the gas consumption of motor vehicles. Consequently, when the engine is stopped, the compressor is no longer driven and the passenger compartment of the vehicle is thus deprived of cool air, which is uncomfortable for the vehicle passengers.

To overcome this drawback, it is known to combine a heat exchange device to reservoirs of heat storage materials storing heat or cold when the heat transfer fluid circulates in the circuit, and returning them to the external fluid when the heat transfer fluid is no longer circulating.

Thus, in the particular case of an air-conditioning circuit, it is known to provide a heat exchange device of reservoirs of cold storing material capable of storing cold when the engine is on and of returning them when the engine is off and the air continues to be blown into the passenger compartment.

Heat exchange devices of this type are known, particularly from patent applications FR2861166, FR2878613, FR2878614, and WO2006059005.

However, these known devices present the drawback, in particular, of necessitating special components and of being relatively complex to manufacture and assemble.

In addition, concerning the application to an air-conditioning evaporator, the known devices can not always function with high-pressure refrigerant fluids, particularly in the context of the use of carbon dioxide ($CO_2$) as heat transfer fluid.

The invention particularly aims at overcoming the aforementioned drawbacks.

To this end, it provides a heat exchange device of the type defined in the introduction, the tubes and the heat storage reservoir forming the reservoir-tubes group wherein the tubes are arranged according to at least two rows of tubes, in particular being offset two-by-two from one row to the other and having two large opposite surfaces which extend perpendicularly to the extension direction of the rows of tubes and constitute, respectively, a fin contact surface and a reservoir contact surface, and wherein the heat exchange reservoir extends transversely to the rows of tubes. The heat exchange reservoir is in contact with a tube of each row, the contact with the tubes taking place alternately on a first wall of the heat storage reservoir and on a second wall of the heat storage reservoir opposite the first wall.

Therefore, in a reservoir-tubes assembly, the heat storage reservoir ensures the contact, with a tube of a respective row, a contact being carried out alternately by the first wall and the second wall.

In other words, the first wall of the heat storage reservoir comes in contact with a large surface of a first tube whose opposite large surface comes in contact with a first fin, and subsequently comes in contact directly with the first fin. On the other side, the second wall of the heat storage reservoir comes in contact with a second fin, and subsequently comes in contact with a large surface of a second tube whose other large surface comes in contact with a second fin. If the device comprises more than two rows of tubes, the same arrangement is reproduced. Therefore, in the case where a device has two rows of tubes, the heat storage reservoir has, for each, the shape of a substantially flattened "S" with, preferably, two parallel arms that surround alternately the tube of the first row and the tube of the second row.

As a result, one can advantageously start from a heat exchange device comprising conventional tubes, provided the tubes are offset one row to the next to enable the setting in place of heat storage reservoirs, the latter extending over the entire width of the heat exchanger, that is, perpendicularly to the direction of the rows of tubes.

The advantage is that conventional tubes can be used for circulating the heat transfer fluid, particularly pressure-resistant tubes in the case where the device must constitute an evaporator through which flows a high-pressure fluid such as $CO_2$.

In a preferred embodiment of the invention, the heat storage reservoir has, on the first wall, at least one tube contact surface and at least one fin contact surface and, on the second wall, at least one fin contact surface and at least one tube contact surface.

The tube contact surfaces and the fin contact surfaces are mutually offset by a distance corresponding to the thickness of a tube, such as defined between its large surfaces, so that each reservoir-tubes group is in contact, each time, with two fin alternately on a large surface of a tube and on a wall of the heat storage reservoir.

As a result, each reservoir-tubes group presents, on one side, a generally planar wall made, alternatingly, of portions of the first wall of the heat storage reservoir and of the large surfaces of the tubes. The same arrangement is present on the other side. This allows for providing excellent heat contact between the different components, that is, the tubes of the stack, the heat storage reservoirs, and the fins.

It is advantageous for the heat storage reservoir to house an inner fin made in the form of a metal band having folds or waves in order to enhance the heat exchange within the storage reservoir.

According to another characteristic of the invention, the heat exchange device comprises a filling duct communicating with the heat storage reservoir to fill them with heat storage material.

The heat storage reservoir is advantageously formed by the assembly of two configured metal plates joined together at their peripheries by respective contact surfaces, the metal plates forming, respectively, the first and second walls of the heat storage reservoir.

According to another characteristic of the invention, the heat exchange device comprises two headers communicating with ends of the tubes of the stack. According to a first alternative, the two headers are arranged on each side of the stack of tubes. Alternatively, the two headers are arranged on the same side of the stack of tubes.

The tubes of the stack are preferably extruded tubes with multiple channels. This is particularly interesting when the heat transfer fluid is a refrigerant fluid circulating at high pressure, like $CO_2$.

The invention particularly applies to the case where the device constitutes an evaporator, the heat transfer fluid being a refrigerant fluid and the heat storage material being a material for storing cold.

Other characteristics and advantages of the invention will become apparent from reading the description that follows with reference to the annexed drawings, given by way of non-limiting examples, which can serve to understand the present invention and the description of its implementation but also, if need be, to contribute to its definition according to which:

FIG. 10 is a top view of a reservoir-tubes group with a heat storage reservoir constituted of two shells;

FIG. 11 is a cross-sectional view of the reservoir-tubes group of FIG. 10;

FIGS. 12 to 14 are respectively cross-sectional views along the line XII-XII, along the line XIII-XIII, and along the line XIV-XIV of FIG. 11;

FIG. 15 is a view, similar to FIG. 10 according to an alternative embodiment;

FIG. 16 is a view, similar to FIG. 10 according to another alternative embodiment;

FIG. 17 is a schematic, perspective view of a reservoir-tubes group comprised between two fins in the assembled state;

FIG. 18 is an exploded, perspective view of the reservoir-tubes group of FIG. 17;

FIG. 19 is a partial, exploded, perspective view showing a portion of the two walls of the heat storage reservoir;

Figure 1:
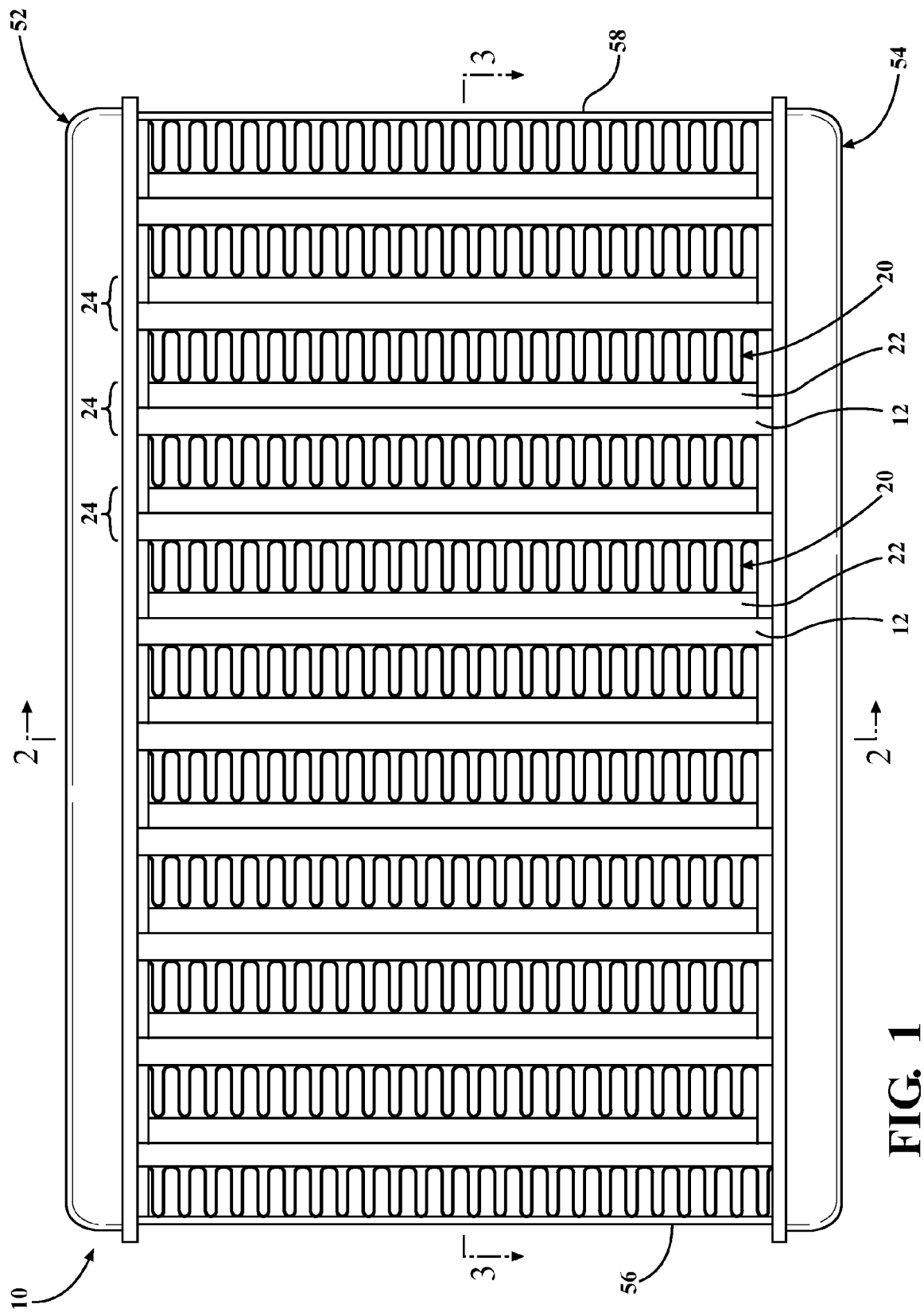
FIG. 1 is a front view of a heat exchange device according to the present invention.
Figure 2:
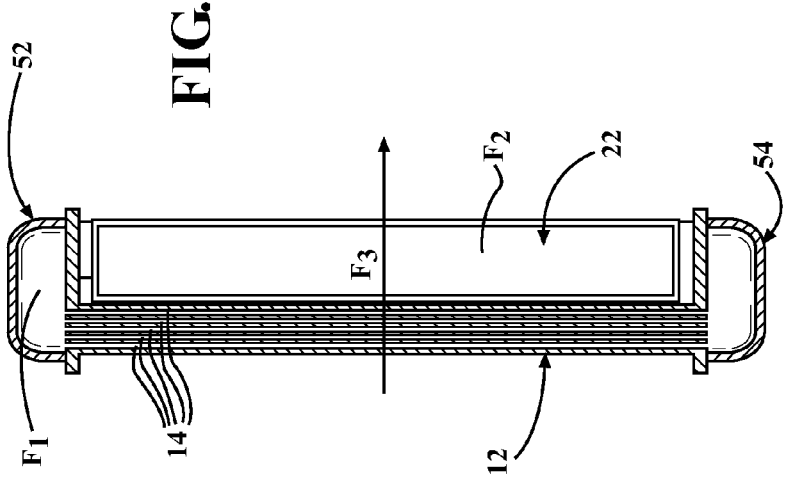
FIGS. 2 and 3 are, respectively, views along the line II-II and along the line III-III of FIG. 1.
Figure 3:
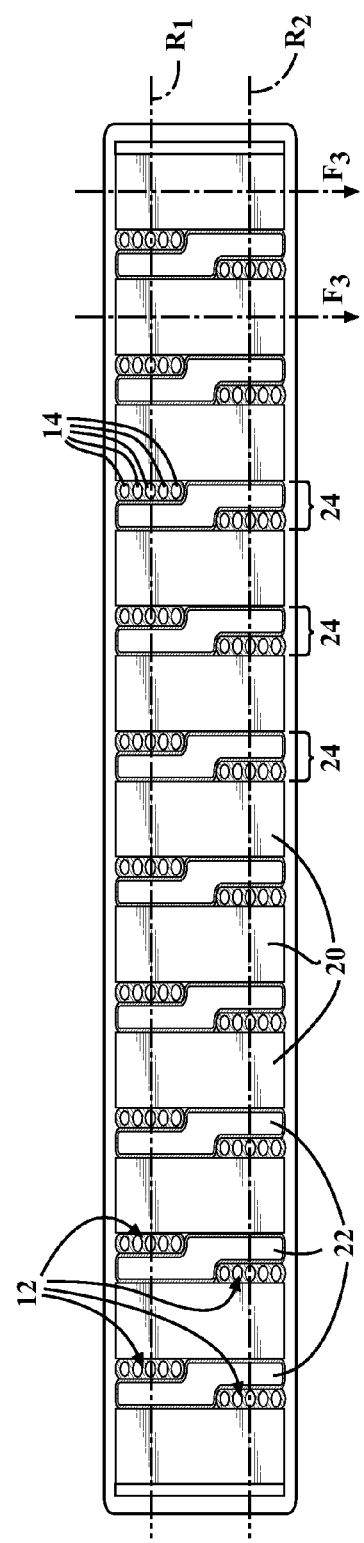

The heat exchange device 10 shown in FIGS. 1 to 3 comprises a stack of tubes 12 for the circulation of a heat transfer fluid $F_1$.

According to a preferred example of the present invention, the heat transfer fluid $F_1$ is a refrigerant fluid. The refrigerant fluid can be subjected to a thermodynamic cycle causing a phase change such as a fluid functioning entirely or partly in sub-critical mode, or a refrigerant fluid that can be subjected to thermodynamic cycle that does not trigger a phase change, such as a fluid functioning in supercritical mode. The refrigerant fluid can be constituted of carbon dioxide ($CO_2$). However, the present invention also applies to heat exchange devices 10 through which flows any type of fluid, particularly diverse refrigerants, water, etc.

In the exemplary embodiment and such as shown in FIG. 3, the tubes 12 are flat tubes arranged according to two rows $R_1$ and $R_2$ of tubes 12. Advantageously, the two rows $R_1$ and $R_2$ of tubes 12 are arranged parallel to each other. The tubes 12 each comprise a plurality of inner channels 14, shown in FIGS. 2 and 3. Such an arrangement in a plurality of inner channels 14 makes it possible to enhance the strength of the tube 12 to the internal pressure present in the tube 12.

Figure 4:
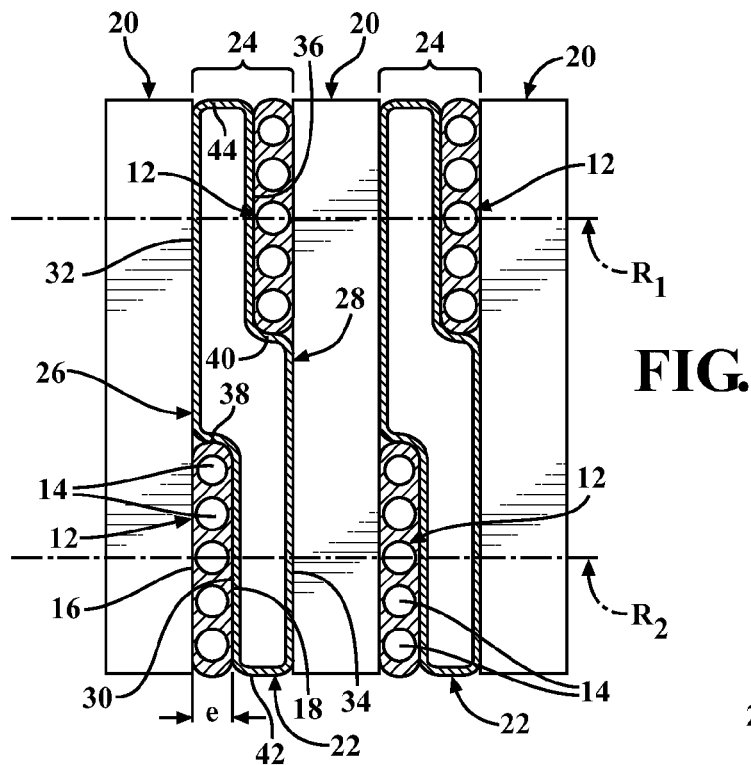
FIG. 4 is a detailed view at an enlarged scale, of a part of FIG. 3.

The tubes 12 have two large opposite surfaces 16 and 18, such as shown in FIG. 4. The two large surfaces 16 and 18 extend perpendicularly to the extension direction of the rows $R_1$ and $R_2$ of tubes 12.

Figure 5:
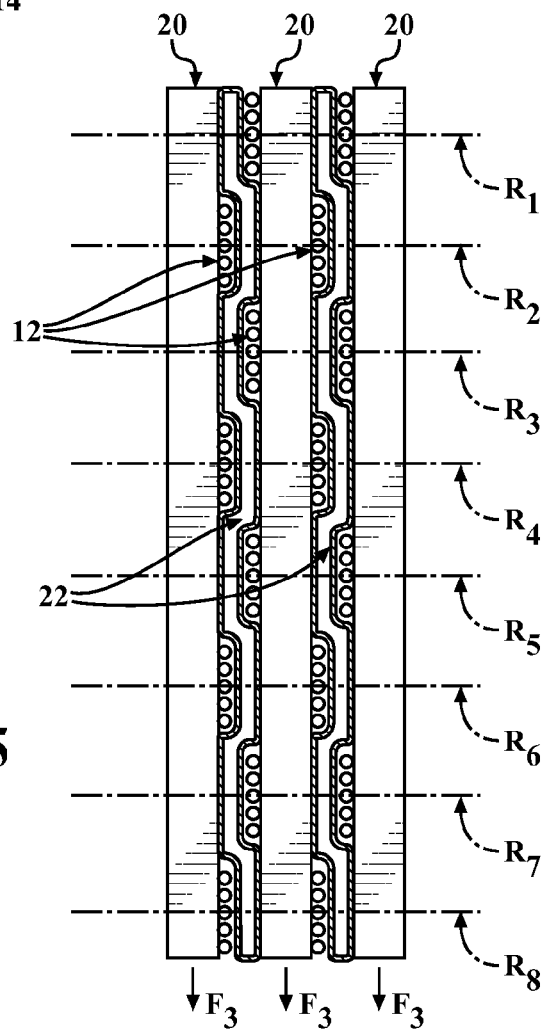
FIG. 5 is a view, similar to FIG. 4 in the case of a heat exchange device with eight rows of tubes.

According to a preferred embodiment of the present invention, the tubes 12 are offset from one row to another, as shown in FIGS. 3, 4, and 5. The tubes 12 are thus arranged in staggered rows on the rows of tubes $R_1$ and $R_2$.

The heat exchange device 10 further comprises an assembly of heat exchange fins 20. The heat exchange fins 20 preferably have a conventional corrugated shape such as shown in FIG. 1. In addition, the heat exchange device 10 comprises heat storage reservoirs 22 for containing a heat storage material. According to the example of the present invention, the heat storage material allows for storing cold. Alternately, the heat storage material can have a different composition which can enable it to store heat.

The heat storage reservoirs 22 extend transversely to the rows $R_1$ and $R_2$ of tubes 12, according to the arrangement of FIGS. 3 and 4. It is thus formed of reservoir-tube groups 24 wherein the same heat storage reservoir 22 is in contact with a tube 12 of each of the rows $R_1$ and $R_2$ of tubes 12. Such an arrangement is particularly shown in FIG. 3. Therefore, each heat storage group 24 comprises a heat storage reservoir 22 and two tubes 12 belonging, respectively, to the two rows $R_1$ and $R_2$ of tubes.

In the example shown in FIGS. 1 to 3, the heat exchange device 10 comprises ten reservoir-tube groups 24 and eleven reservoir-tube fins 20. The heat exchange device 10 further comprises two headers 52 and 54 into which ends of tubes 12 of the stack and two end flanges 56 and 58. The end flanges 56 and 58 laterally frame the stack of tubes 12 and come into contact with a heat exchange fin 20 located at the end of the stack of tubes 12.

The heat storage reservoir 22, as shown in FIG. 4, comprises a first wall 26 located on the left side of the heat storage reservoir 22 of FIG. 4 and a second wall 28 opposite the first wall 26 and located on the right side of the heat storage reservoir 22 of FIG. 4.

The large surfaces 16 and 18 of the tubes 12 form, respectively, a contact surface with the heat exchange fin 20 and a contact surface with the heat storage reservoir 22. The first wall 26 of the heat storage reservoir 22 comprises a tube contact surface 30 coming into contact with one of the large surfaces 18 of the tube 12 whose large opposite surface 16 comes into contact with a first heat exchange fin 20. The tube contact surface 30 of the first wall 26 connects to a fin contact surface 32 coming into contact with the first heat exchange fin 20.

The tube contact surface 30 and the fin contact surface 32 of the first wall 26 of the heat storage reservoir 22 are offset by a distance "e", as shown in FIG. 4. The distance "e" corresponds to the thickness of a tube 12 such as defined between its large surfaces 16 and 18.

Therefore, on the left side of the reservoir-tube group 24 of FIG. 4, the first wall 26 of the heat storage reservoir 22 comes into contact alternately with a large surface 18 of a tube 12 of the row $R_2$ and with a heat exchange fin 20 located to the left of the reservoir-tube group 24. Furthermore, the second wall 28 of the heat storage reservoir 22 comprises a fin contact surface 34 coming into contact with the heat exchange fin 20 located to the right of the reservoir-tube group 24 and a tube contact surface 36 coming into contact with a large surface 16 of a tube 12 of row $R_1$.

The tube contact surface 30 and the fin contact surface 32 of the first wall 26 of the heat storage reservoir 22, the tube contact surface 36 and the fin contact surface 34 of the second wall 28 of the heat storage reservoir 22, respectively, are connected together by a connection part 38 and a connection part 40, respectively. In addition, the tube contact surface 30 of the first wall 26 and the fin contact surface 34 of the second wall 28, respectively, the tube contact surface 36 of the second wall 28 and the fin contact surface 32 of the first wall 26 are connected by a connection part 42 and a connection part 44, respectively. The connection parts 42 and 44 are generally parallel to one another.

The tube contact surfaces 30 and 36, the fin contact surfaces 32 and 34 and the connection parts 38, 40, 42, and 44 form an enclosed internal volume defining the heat storage reservoir 22.

Thus, as shown in cross-section, the heat storage reservoir 22 has a cross-section similar to that of an "S" whose arms are offset and, preferably, parallel. As a result, the heat storage reservoir 22 extends transversely to the rows $R_1$ and $R_2$ of tubes by forming, for each, a reservoir-tubes group 24 wherein the same heat storage reservoir 22 is in contact with a tube 12 of each row $R_1$ and $R_2$, the contact with the tubes 12 being carried out alternately on the first wall 26 and on the second wall 28 of the heat storage reservoir 22.

The embodiment of FIGS. 1 to 4 corresponds to the case of a heat exchange device with two rows $R_1$ and $R_2$ of tubes 12. The heat storage reservoirs 22 are intended to contain a heat storage material $F_2$. According to the example, the heat storage material $F_2$ allows for storing cold. The stack of tubes 12 thus formed is adapted to have an air flow $F_3$, circulating between the reservoir-tube groups 24 and each time passing through the heat exchange fins 20, as shown in FIG. 3.

In the example of FIGS. 1 to 4, the stack of tubes 12 comprises two rows $R_1$ and $R_2$ of tubes 12. However, the stack of tubes 12 can comprise a greater number of rows of tubes 12. FIG. 5 shows an example where the stack of tubes 12 comprises eight rows $R_1$ to $R_8$ of tubes 12. In this configuration, each of the first and second walls 26 and 28 opposite the heat storage reservoirs 22 comprises alternately a tube contact surface 30, 36, respectively and a fin contact surface 32 34, respectively.

Figure 6:
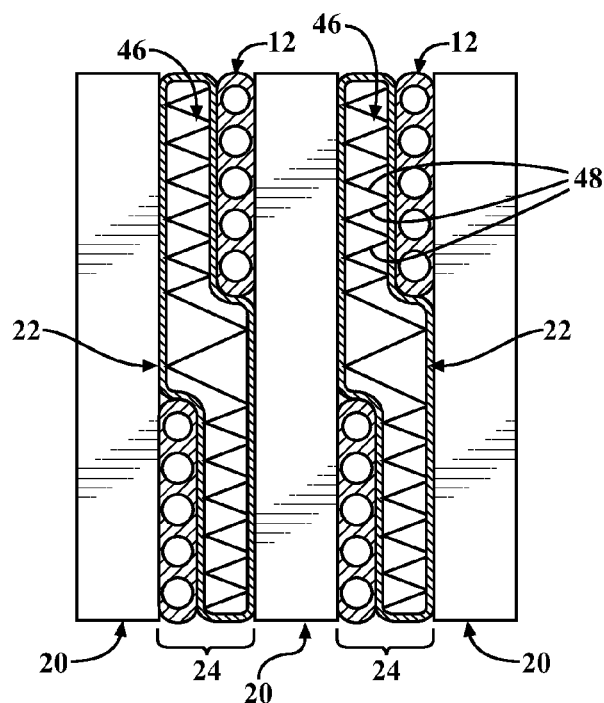
FIG. 6 is a cross-sectional view according to FIG. 4, wherein the heat storage reservoirs comprise inner fins.
Figure 7:
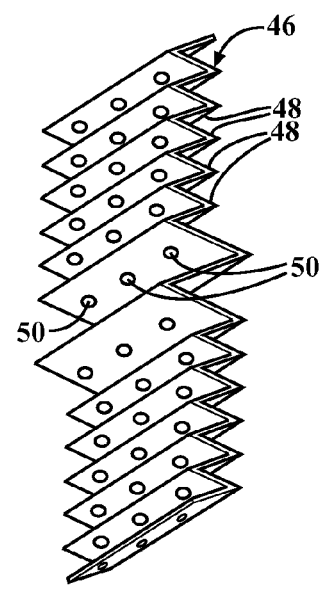
FIG. 7 is a perspective view of an inner space.

Reference is now made to FIGS. 6 and 7. FIG. 6 is a view, similar to FIG. 4, and which shows an alternative embodiment. With this embodiment, the heat storage reservoir 22 houses an inner fin 46. Advantageously, the inner fin 46 made in the form of a metal band having folds or waves 48, here zigzag folds. Having an inner fin 46 enhances the heat exchanges between the heat storage material $F_2$ and the tubes in which the heat transfer fluid $F_1$ circulates and the heat exchange fin 20 through which flows the external fluid, here the air flow $F_3$.

FIG. 7 shows a perspective view of the inner fin 46. The inner fin 46 comprises communication orifices 50 made in each wave 48. The communication orifices 50 are distributed over one or more rows arranged over the height of the inner fin 46. The communication orifices 50 allow for a placing in relation between the cavities formed by the inner fin 46 in the heat storage reservoir 22 and optimally filling these cavities by the thermal storage material $F_2$. Furthermore, the inner fins 46 can reinforce the heat storage reservoirs 22 internally.

Figure 8:
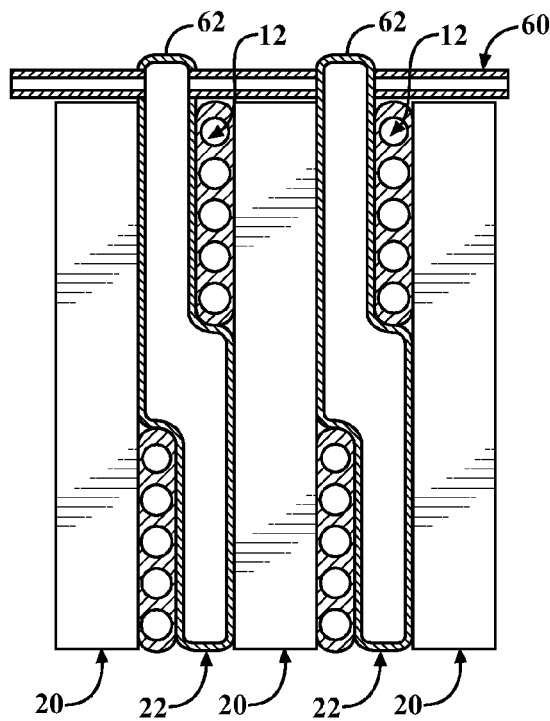
FIG. 8 is a cross-sectional view similar to FIG. 4 showing a filling duct according to a first embodiment.

According to the exemplary embodiment of FIG. 8, a filling duct 60 is arranged so as to communicate with the heat storage reservoirs 22 to fill them with heat storage material $F_2$. The filling duct 60, having, for example a circular cross-section or other, is located in the upper portion of the heat storage reservoirs 22 in parallel with one of the headers 52 or 54 of the heat exchange device 10, here, the header 52. The filling duct 60 extends outside of the stack of tubes 12 and communicates with end regions 62 of the heat storage reservoirs 22 which laterally project with respect to the stack of tubes 12.

Figure 9:
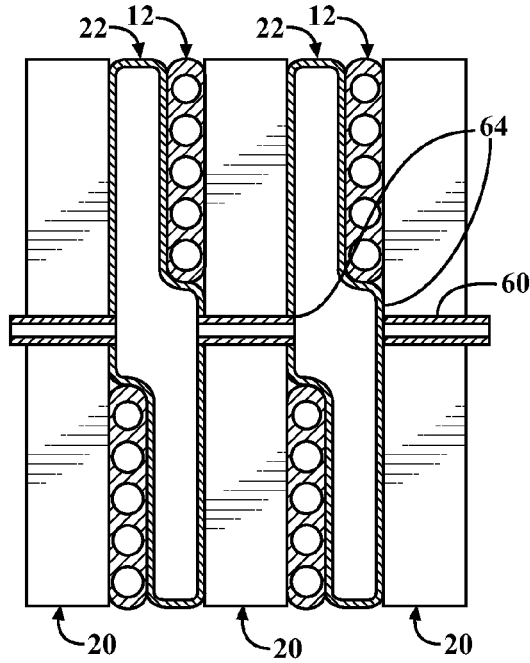
FIG. 9 is a view, similar to FIG. 8 showing the filling duct according to an alternative embodiment.

FIG. 9 shows an alternative arrangement of the filling duct of the heat storage reservoirs 22. According to this embodiment, the filling duct 60 extends inside the stack of tubes 12 between two successive rows of tubes 12 and communicates with intermediary regions 64 of the heat storage reservoirs 22. The filling duct 60 of FIGS. 8 and 9 is an inserted element or an element integrated with a header 52 or 54 of the heat exchange device 10.

Reference is now made to FIGS. 10 to 14. FIG. 10 shows a heat storage reservoir 22 formed by assembling two configured metal plates 66 and 68 connected together at their peripheries by respective contact surfaces 70 and 72. The configured metal plates 66 and 68 are preferably pressed plates, but they can also be made differently, for example by molding.

The configured metal plate 66 defines two inner cavities 74 and 76, shown in FIG. 11. The inner cavity 74, located in contact with the heat exchange fin 20, is greater than the inner cavity 76 located in contact with the tube 12. Similarly, the configured plate 68 comprises two inner cavities 78 and 80, the inner cavity 78 located in contact with the other heat exchange fin 20 being greater than the inner cavity 80 located in contact with the other tube 12.

In the example of FIGS. 10 to 14, according to a particular exemplary embodiment, the inner cavities 74 and 76 have different depths, so do the inner cavities 78 and 80, and the respective contact surfaces 70 and 72 are coplanar.

The FIGS. 12, 13, and 14 are cross-sectional detailed views showing the structure of the cavities along the lines XII-XII, XIII-XIII, and XIV-XIV of FIG. 11.

FIG. 15 is similar to FIG. 10, showing an alternative according to which each of the configured plates 66 and 68 comprises only one cavity, namely, a cavity 74 and a cavity 78, respectively located in contact with the heat exchange fin 20, the respective contact surfaces 70 and 72 of the two configured plates 66 and 68 being coplanar.

FIG. 16 shows another alternative in which the configured plates 66 and 68 have only one cavity, namely, a cavity 74 and a cavity 78, respectively, located in contact with the heat exchange fin 20 as in FIG. 15, and wherein the respective contact surfaces 70 and 72 extend over two parallel planes connected together by a diagonal plane.

Every time, the shape of the cavities is adapted as a function of the relative position of the tubes situated on each side of the heat storage reservoir 22.

FIGS. 10, 15, and 16 show three configurations of the heat storage reservoirs 22 of storage materials. Each configuration has a reservoir-tube group with three different widths. Depending on the width of the assembly, the volume of each heat storage reservoir 22 is more or less substantial. For a heat exchange device 10 having a given height, width, and depth, the total volume of the heat storage reservoirs 22 will depend on the width of the fin and on the width of a tubes-reservoirs assembly.

FIG. 10 shows a configuration where the distance between the tubes 12 in the direction of the rows of tubes is greater than the thickness of the contact surfaces 70 and 72 of the heat storage reservoir 22 of the heat storage material $F_2$ constituted by the configured plates 66 and 68. Each configured plate 66 and 68 of the heat storage reservoir 22 comprises two cavities 74, 76, and 78, 80, respectively, having a different depth. The contact surface 70, and 72, respectively, of the configured plate 66, 68, respectively of the heat storage reservoir 22 is planar.

FIG. 15 shows the limit configuration where the distance between the two tubes 12 in the direction of the rows of tubes is equal to the thickness of the contact surfaces 70 and 72 of the heat storage reservoir 22 of the heat storage material $F_2$ constituted by the configured plates 66, 68 of the heat storage reservoir 22. Each configured plate 66, 68, of the heat storage reservoir 22 is formed by only one cavity 74, 78, respectively. The contact surface 70, 72, of the configured plate 66, 68, respectively, of the heat storage reservoir 22 is planar.

FIG. 16 shows a configuration where the distance between the tubes 12 in the direction of the rows of tubes does not make it possible to have a contact surface of the configured plate 66, 68, respectively, of the planar heat storage reservoir 22. The configured plate 66, 68, respectively, constituting the heat storage reservoir 22, is bent to ensure a partial alignment with the two tubes 12, a respective cavity 74, 78 being subsequently formed, for example pressed, in each of the configured plates 66 and 68 of the heat storage reservoir 22.

FIG. 17 shows a reservoir-tubes group comprised between two heat exchange fins 20, the latter being schematically shown. FIG. 18 shows the same reservoir-tubes group shown in an exploded, perspective view.

Similarly to FIG. 8, each of the configured plates 66 and 68 forming a heat storage reservoir 22 comprises an end portion 62 projecting laterally from the stack of tubes 12 and comprising an orifice 82 for the passage of a filling duct 60 similar to that previously described.

As more particularly shown in FIG. 19, the configured plates 66 and 68 have inner bosses 84. The inner bosses 84 provide a reinforcement function. In the example, the inner bosses 84 have a generally truncated shape with a flat bottom 86. In the example, each of the configured plates 66 and 68 comprises six pairs of bosses. The bosses 84 of each of the configured plates 66 and 68 come into contact two by two via their respective bottoms 86 which can be assembled together by soldering. This allows for reinforcing the structure of the heat storage reservoir 22.

Figure 20:
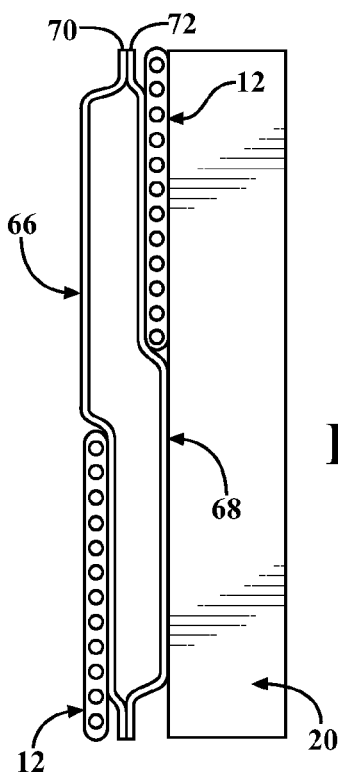
FIG. 20 is a transverse, cross-sectional view of a reservoir-tubes assembly and of a fin, passing outside of the bosses.

FIG. 20 is a cross-sectional view passing outside of the bosses 84 and corresponds to the embodiment of FIGS. 10 to 14.

Figure 21:
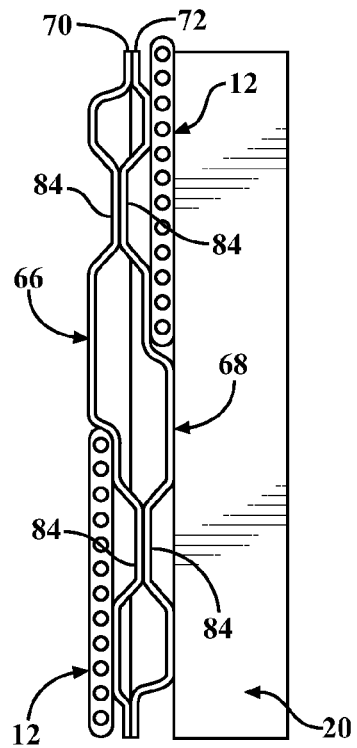
FIG. 21 is a transverse, cross-sectional view of a reservoir-tubes assembly and space, passing through two bosses.

FIG. 21 is a cross-sectional view passing through the bosses 84 facing one another. One can see that the respective flat bottoms 86 of the bosses 84 are in mutual contact.

Figure 22:
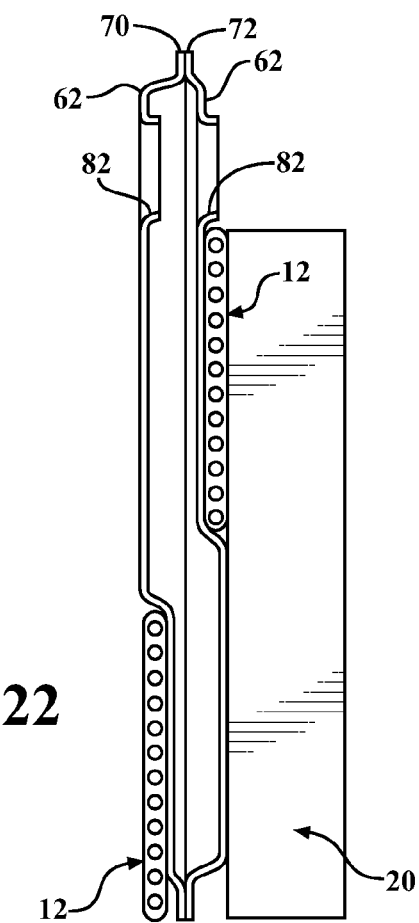
FIG. 22 is a cross-sectional view in the area of the filling orifices of the heat storage reservoir.

FIG. 22 is a cross-sectional view of the area of the end regions 62. One can see that the two orifices 82 are adapted to receive a filling duct 60.

The different components of the heat exchange device 10 of the invention (tubes, fins, reservoirs, headers, flanges, filling tubes . . . ) are advantageously made of aluminum or aluminum-based alloy and soldered together in a single operation.

As already indicated, the tubes 12 used in the heat exchange device 10 can be standard tubes, in particular pressure-resistant tubes.

In the embodiments previously described, the tubes 12 are extruded tubes with multiple channels which can resist high pressures, typically on the order of 300 bars, such as those encountered when $CO_2$ is used as a refrigerant fluid.

The invention more particularly applies to air-conditioning evaporators wherein the heat transfer fluid is a refrigerant fluid and the heat storage material is a material for storing cold.

It is preferred to use, as a material for storing cold, phase change fluids whose fusion temperature is comprised between 0° C. and 15° C., preferably between 4° C. and 8° C. One can cite, as an example, materials from the family of paraffins, salt hydrates, eutectic compounds. The invention can also apply to the case where the heat storage material is a material for storing heat.

The invention particularly applies to heat exchangers for motor vehicles.

Naturally, the invention is not limited to the embodiments previously described and are provided only by way of example. It encompasses various modifications, alternative forms, and other alternatives which one having ordinary skill in the art can envision in the context of the present invention and particularly any combination of the different embodiments previously described.

The invention claimed is:

1. A heat exchange device comprising at least two tubes (12) for the circulation of a heat transfer fluid ($F_1$), a heat exchange fin (20), and a heat storage reservoir (22) of a heat storage material (F2), the tubes (12) and the heat storage reservoir (22) forming a reservoir-tubes group (24), wherein the tubes (12) are arranged along at least two rows of tubes ($R_1$, $R_2$) and have two large opposite surfaces (16,18) extending perpendicularly to the extension direction of the rows of tubes ($R_1$, $R_2$) and constituting a fin contact surface and a reservoir contact surface, respectively, and in that the heat storage reservoir (22) extends transversely to the rows of tubes ($R_1$, $R_2$) and is in contact with a tube (12) of each row of tubes ($R_1$, $R_2$), the contact with the tubes (12) being carried out alternately on a first wall (26) of the heat storage reservoir (22) and on a second wall (28) of the heat storage reservoir (22) opposite the first wall (26).

2. The device according to claim 1, wherein the tubes (12) are offset two-by-two from one row of tubes ($R_1$, $R_2$) to the other.

3. The device according to claim 1, wherein the first and second walls (26,28) of the heat storage reservoir (22) have at least one tube contact surface (30,36) and at least one fin contact surface (32,34), respectively.

4. The device according to claim 3, wherein the tube contact surfaces (30,36) and the fin contact surfaces (32,34) of the same wall (26,28) of the heat storage reservoir (22) are mutually offset by a distance (e) corresponding to the thickness of the tube (12) defined between the two large surfaces (16, 18).

5. The device according to claim 1, wherein the reservoir-tubes group (24) is in contact with two fins (20) alternately by means of the large surface (16, 18) of one of the tubes (12) and of the first wall (26) or of the second wall (28) of the heat storage reservoir (22).

6. The device according to claim 1, wherein the heat storage reservoir (22) houses an inner fin (46) made in the form of a metal band having folds or waves (48).

7. The device according to claim 6, wherein the communication orifices (50) are housed through folds or waves (48) of the inner fin (46) to facilitate the filling of the heat storage material ($F_2$).

8. The device according to claim 1, further comprising a filling duct (60) communicating with the heat storage reservoir (22) to ensure the filling of heat storage material ($F_2$).

9. The device according to claim 8, wherein the filling duct (60) extends outside the stack of tubes (12) and communicates with end regions (62) of the heat storage reservoirs (22).

10. The device according to claim 8, wherein the filling duct (60) extends inside the stack of tubes (12) between two successive rows of tubes (12) and communicates with intermediary regions (64) of the heat storage reservoir (22).

11. The device according to claim 1, wherein the heat storage reservoir (22) is formed by the assembly of two metal plates (66,68) configured and joined together at their peripheries by respective contact surfaces (70,72).

12. The device according to claim 11, wherein the metal plates (66,68) each delineate two cavities (74,76; 78,80) having different depths.

13. The device according to claim 11, wherein the metal plates (66,68) each delineate one cavity (74,78).

14. The device according to claim 11, wherein the metal plates (66,68) have inner reinforcement bosses (84).

15. The device according to claim 11, wherein the contact surfaces (70,72) are coplanar.

16. The device according to claim 11, wherein the contact surfaces (70,72) extend over two parallel planes joined together by a diagonal plane.

17. The device according to claim 1, wherein the heat exchange device (10) comprises two headers (52,54) communicating with ends of the tube (12) of the stack.

18. The device according to claim 1, wherein the tube (12) of the stack is an extruded tube with multiple channels (14).

19. The device according to claim 1, wherein the heat exchange device (10) is an evaporator and in that the heat transfer fluid ($F_t$) is a refrigerant fluid and the heat storage material ($F_2$) is a material for storing cold.

* * * * *